(12) United States Patent
Lee et al.

(10) Patent No.: US 10,145,426 B2
(45) Date of Patent: Dec. 4, 2018

(54) MULTI-MODE CLUTCHES FOR FORWARD/REVERSE PLANETARY GEARSET

(71) Applicant: BorgWarner Inc., Auburn Hills, MI (US)

(72) Inventors: Brett J. Lee, Southfield, MI (US); Christopher E. Blair, Fenton, MI (US); Christopher A. Spangler, Rochester Hills, MI (US); Mitsuru Ishihara, Novi, MI (US)

(73) Assignee: BorgWarner Inc., Auburn Hills, MI (US)

( * ) Notice: Subject to any disclaimer, the term of this patent is extended or adjusted under 35 U.S.C. 154(b) by 573 days.

(21) Appl. No.: 14/770,929

(22) PCT Filed: Feb. 28, 2014

(86) PCT No.: PCT/US2014/019357
§ 371 (c)(1),
(2) Date: Aug. 27, 2015

(87) PCT Pub. No.: WO2014/137798
PCT Pub. Date: Sep. 12, 2014

(65) Prior Publication Data
US 2016/0003308 A1    Jan. 7, 2016

Related U.S. Application Data

(60) Provisional application No. 61/772,836, filed on Mar. 5, 2013, provisional application No. 61/823,998, filed on May 16, 2013.

(51) Int. Cl.
*F16H 57/08*   (2006.01)
*F16D 21/00*   (2006.01)
(Continued)

(52) U.S. Cl.
CPC .............. *F16D 21/00* (2013.01); *F16D 11/14* (2013.01); *F16D 11/16* (2013.01); *F16D 13/52* (2013.01);
(Continued)

(58) Field of Classification Search
CPC ....................................................... F16H 57/08
See application file for complete search history.

(56) References Cited

U.S. PATENT DOCUMENTS 5,836,849 A   11/1998   Mathiak et al.
8,051,959 B2  11/2011   Eisengruber
(Continued)

FOREIGN PATENT DOCUMENTS

| KR | 10-0899635 | 5/2007 |
|---|---|---|
| KR | 10-2007-0078603 | 8/2007 |
| WO | WO 2014/137798 | 2/2014 |

OTHER PUBLICATIONS

International Search Report for related PCT Application No. PCT/US14/019357; report dated Jun. 12, 2014.

*Primary Examiner* — Derek D Knight
(74) *Attorney, Agent, or Firm* — Miller, Matthias & Hull LLP

(57) ABSTRACT

A forward/reverse planetary gearset (412) may be adapted to employ multi-mode clutch modules (426, 430) in lieu of using only traditional friction clutches (326, 330). Such arrangement may reduce parasitic drag as well as achieve reductions in physical size of the gearset housing (408). Use of multi-mode clutch modules (426, 430) may offer either of or both forward and reverse controls of the planetary gearset (412). Thus, in at least one arrangement a multi-mode clutch (426) may provide forward clutch control while a friction clutch (330) provides reverse clutch control. In another arrangement the friction clutch (326) may provide the forward clutch control, while the multi-mode clutch (430)
(Continued)

provides the reverse clutch control for the gearset (412). Finally, both forward and reverse controls of the gearset (412) may be provided via multi-mode clutches (426, 430), thus entirely avoiding use of any friction clutches (326, 330) for forward or reverse control functions of the planetary gearset (412).

20 Claims, 13 Drawing Sheets

(51) Int. Cl.
    *F16D 25/0638* (2006.01)
    *F16D 11/14* (2006.01)
    *F16D 11/16* (2006.01)
    *F16D 25/061* (2006.01)
    *F16H 3/60* (2006.01)
    *F16D 13/52* (2006.01)

(52) U.S. Cl.
    CPC ....... *F16D 25/061* (2013.01); *F16D 25/0638* (2013.01); *F16H 3/60* (2013.01); *F16H 57/08* (2013.01)

(56) References Cited

U.S. PATENT DOCUMENTS

| | | |
|---|---|---|
| 2007/0037659 A1 | 2/2007 | Bailey et al. |
| 2009/0266667 A1 | 10/2009 | Samie et al. |

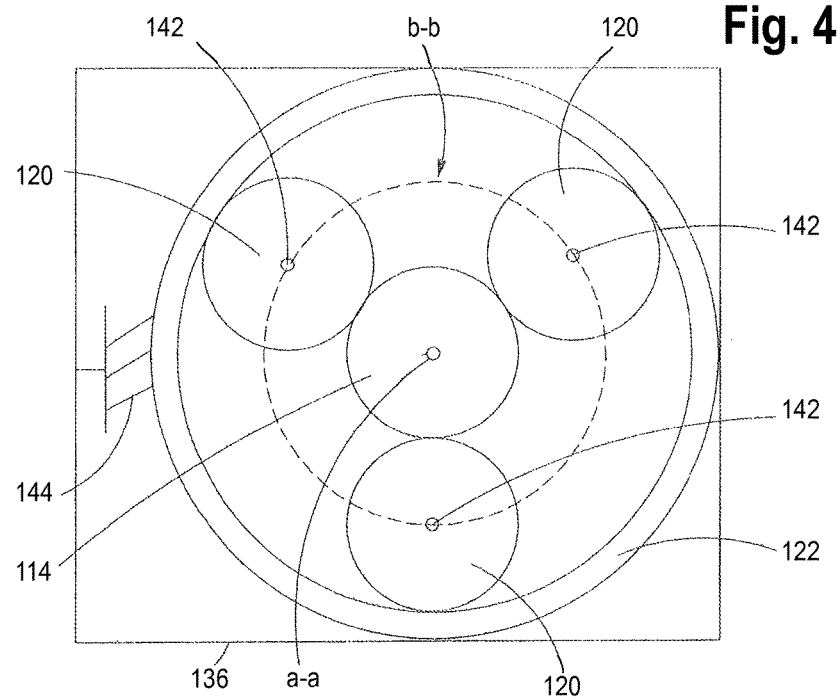
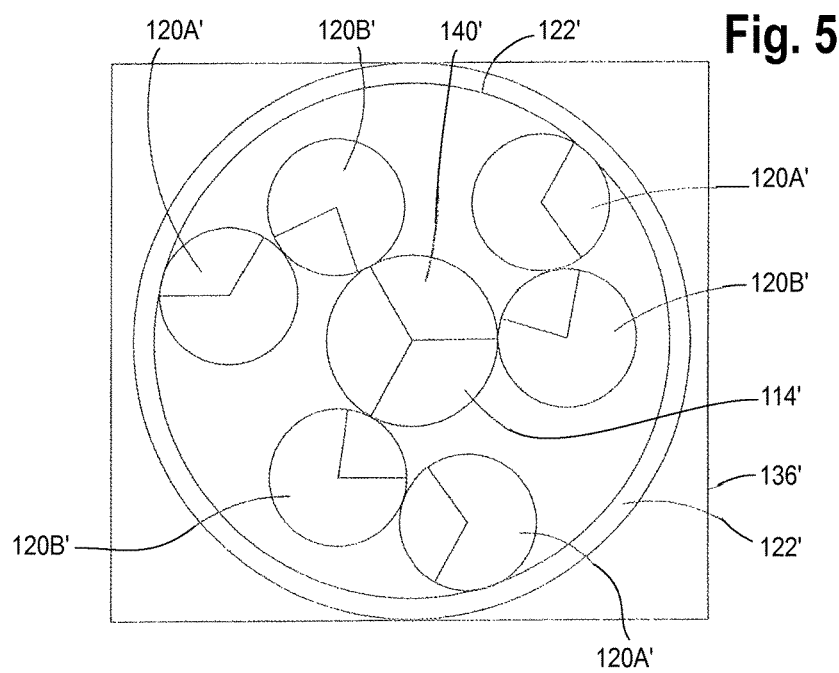

Fig. 6

|    | Input | Output | Grounded via Reverse Clutch | Forward Clutch | Single / Double Planets |
|----|-------|--------|------------------------------|----------------|-------------------------|
| 1  | 1 | 2 | 3 | 1 - 2 | Double |
| 2  | 1 | 2 | 3 | 2 - 3 | Double |
| 3  | 1 | 2 | 3 | 1 - 3 | Double |
| 4  | 1 | 3 | 2 | 1 - 2 | Single |
| 5  | 1 | 3 | 2 | 2 - 3 | Single |
| 6  | 1 | 3 | 2 | 1 - 3 | Single |
| 7  | 2 | 1 | 3 | 1 - 2 | Double |
| 8  | 2 | 1 | 3 | 2 - 3 | Double |
| 9  | 2 | 1 | 3 | 1 - 3 | Double |
| 10 | 2 | 3 | 1 | 1 - 2 | Double |
| 11 | 2 | 3 | 1 | 2 - 3 | Double |
| 12 | 2 | 3 | 1 | 1 - 3 | Double |
| 13 | 3 | 1 | 2 | 1 - 2 | Single |
| 14 | 3 | 1 | 2 | 2 - 3 | Single |
| 15 | 3 | 1 | 2 | 1 - 3 | Single |
| 16 | 3 | 2 | 1 | 1 - 2 | Double |
| 17 | 3 | 2 | 1 | 2 - 3 | Double |
| 18 | 3 | 2 | 1 | 1 - 3 | Double |

Legend

1 = Sun Gear
2 = Planet Carrier
3 = Ring Gear

MULTI-MODE CLUTCHES FOR FORWARD/REVERSE PLANETARY GEARSET

RELATED APPLICATIONS

This non-provisional application is based upon, and hereby claims priority to, U.S. 61/772,836, filed on Mar. 5, 2013, and U.S. 61/823,998, filed on May 16, 2013, both as provisional applications.

FIELD OF DISCLOSURE

The present disclosure relates generally to planetary gearset systems adapted to provide forward and reverse control in vehicular as well as industrial applications, and more particularly to gearset systems that include one or more multi-mode clutches adapted to facilitate such control.

BACKGROUND OF DISCLOSURE

Although the forward/reverse planetary gearset system of this disclosure is broadly applicable to numerous fields of use, an automotive point of reference will be used to provide an initial context for introducing the disclosed gearset system, albeit by way of example only.

An automotive vehicle typically includes an internal combustion engine containing a rotary crankshaft configured to transfer motive power from the engine through a driveshaft to the wheels. A transmission is interposed between engine and driveshaft components to selectively control torque and speed ratios between the crankshaft and driveshaft. In a manually operated transmission, a corresponding manually operated clutch may be interposed between the engine and transmission to selectively engage and disengage the crankshaft from the driveshaft to facilitate manual shifting among available transmission gear ratios.

On the other hand, if the transmission is automatic, the transmission will normally include an internal plurality of automatically actuated clutches adapted to dynamically shift among variously available gear ratios without requiring driver intervention. Pluralities of clutches, also called clutch modules, are incorporated within such transmissions to facilitate the automatic gear ratio changes. Finally, a torque converter may also be interposed between the engine and transmission systems, as those skilled in the art will appreciate.

In an automatic transmission of an automobile, numerous forward gear ratios are generally selectively available, along with at least one reverse gear. The various gears within the automatic transmission are typically comprised of planetary gearsets, including sun and planetary pinion gears supported by carriers, all movable with respect to one another as well as within and relative to so-called ring gears. Specific transmission clutches are typically associated with specific sets of the selectable gears within the transmission to facilitate the desired ratio changes.

For accommodating multiple gear ratios, the planetary gearsets are often used in combination with at least two friction clutches to manage directional control. One such friction clutch is adapted to handle the forward gear ratios, while the second is adapted to handle reverse gear ratios.

The friction clutches are typically hydraulically operated disc clutches, in which a set of interleaved friction discs and separator plates are splined to hub and drum components, respectively. The clutch is engaged and disengaged by means of an actuating piston, as those skilled in the art will appreciate. A common problem with this type of clutch is its tendency to develop parasitic drag, particularly when the friction discs and separator plates fail to fully disengage. Another problem relates to their bulkiness, especially because their associated pistons and springs may require special packaging and sizing considerations.

SUMMARY OF DISCLOSURE

In accordance with one aspect of the disclosure, an automatic transmission incorporates a planetary gearset, and includes at least one multi-mode clutch module.

In accordance with another aspect of the disclosure, a multi-mode clutch module, when used to replace one of the above-described forward/reverse friction clutches, is effective to reduce parasitic drag and/or spin loss, and to reduce overall packaging envelope or size of the exterior transmission housing, particularly in its axial dimension.

In accordance with yet another aspect of the disclosure, dual multi-mode clutches control respective forward and reverse rotations of a planetary gearset system that includes one friction clutch to enhance shifting function of the modules within an automatic transmission.

In accordance with yet another aspect of the disclosure, the forward multi-mode clutch module is radially nested within the reverse multi-mode clutch module to reduce the axial length of the housing of the automatic transmission.

In accordance with yet another aspect of the disclosure, both forward and reverse modules operate as dog clutches adapted to function in dual modes, each providing for engaged or locked operation in both driving and non-driving rotational directions in the first mode and freewheeling in both of such directions in the second mode.

Finally, in accordance with a still further aspect of the disclosure, when either of the forward and reverse multi-mode clutches is engaged, that respective multi-mode clutch is locked in both driving and non-driving rotational directions, while the other multi-mode clutch freewheels in both driving and non-driving rotational directions.

These and other aspects and features of the present disclosure may be better appreciated by reference to the following detailed description and accompanying drawings.

BRIEF DESCRIPTION OF DRAWINGS

FIG. 4 is a schematic view of a planetary gearset of a type having single planetary gears.

FIG. 5 is a schematic view of a planetary gearset of a type utilizing double planetary gears; i.e., having compound planetary gears.

FIG. 6 is a chart depicting a variety of forward and reverse clutch configurations utilizing various planetary combinations of sun, planet, and ring gears, as depicted in FIGS. 7 and 8.

It should be understood that the drawings are not to scale, and that the disclosed embodiments are illustrated only diagrammatically and in partial views. It should also be understood that this disclosure is not limited to the particular embodiments illustrated herein.

DETAILED DESCRIPTION

Figure 1:
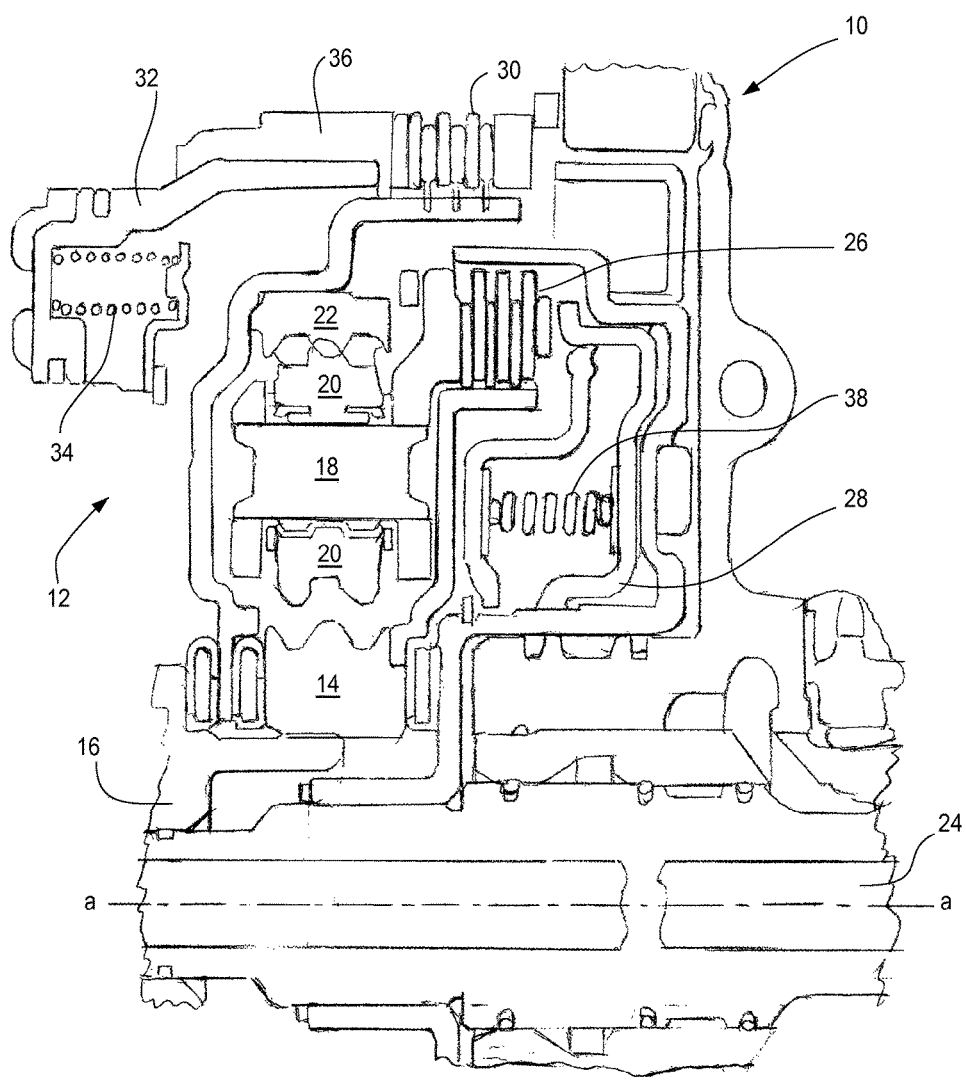
FIG. 1 is a schematic view of a planetary gearset system having forward and reverse friction clutches constructed in accordance with the prior art.

FIG. 1 is a fragmentary schematic depiction of a prior art planetary gearset system 10 containing parts adapted to rotate about an axis a-a. The gearset system 10 includes a planetary gearset 12. The gearset 12 includes a sun gear 14 coupled to a transmission input component 16. A planetary gear carrier 18 may comprise a plurality of either single planetary gears 20 or double/compound planetary gears, to be further described herein. The sun gear 14 and planetary gears 20 rotate about and within a ring gear 22. A gearset output component 24 may be adapted to ultimately power the driveline of a vehicle (neither shown). Those skilled in the art will appreciate that the gearset output component 24 may alternatively be operated as an input component in lieu of the currently deployed transmission input component 16, and vice versa; i.e. the described input component 16 may be operated as the output component. This reverse functionality is deemed to apply throughout all of the examples provided within this disclosure.

A first friction clutch acts as a forward clutch 26, and is adapted to be engaged during operation of all forward operating gears of the transmission. The forward clutch 26 is actuated by a piston actuator assembly 28. A second friction clutch acts as a reverse clutch 30, and is adapted to be engaged only during reverse operation of the gearset. The reverse clutch 30 is actuated by a piston actuator assembly 32, while the forward clutch 26 is actuated by a piston actuator assembly 28.

The gearset 12 includes a housing 36. Bulkiness of the housing 36 is unfortunately an attribute of a friction-style clutch system, such as that of clutches 26 and 30. For example, the piston actuators 28 and 32 have spring 38 and 34 respectively that may utilize significant amounts of physical space for their accommodation within the gearset housing 10. Moreover, the friction discs and separator plates as shown, but referenced only generally as 26 and 30 in the schematic of FIG. 1, may have a tendency to promote parasitic drag.

Figure 2:
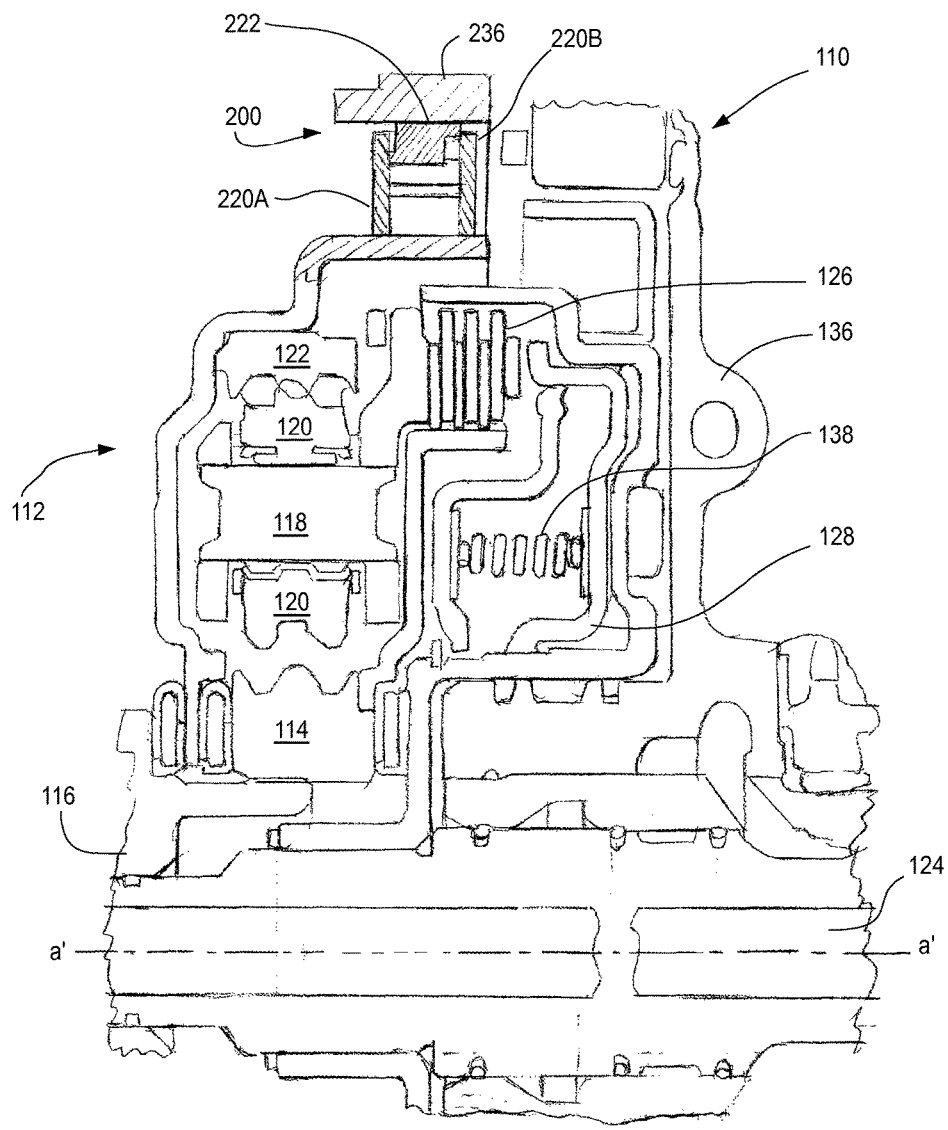
FIG. 2 is a schematic view of a planetary gearset system constructed in accordance with the present disclosure, also including forward and reverse clutches, but with the reverse friction clutch of FIG. 1 replaced by a multi-mode clutch module.

Referring now to FIG. 2, a multi-mode clutch module 200, shown oriented along an axis a'-a', may be used in place of the described friction clutch 30 (FIG. 1) to achieve the greater efficiencies noted above. As such, in FIG. 2, a planetary gearset system 110 is displayed in accordance with the disclosure presented herein. The gearset system 110 incorporates a planetary gearset 112, sun gear 114, a transmission input component 116, and planetary carrier 118, similar to the elements described with respect to the gearset system 10 of FIG. 1. Correspondingly, in FIG. 2 the transmission 110 contains a planetary gear 120, ring gear 122, an output component 124, as well as a forward friction clutch 126 and associated piston actuator assembly 128. However, the gearset system 110 incorporates a multi-mode clutch module 200, which replaces the second or reverse friction clutch 30 (FIG. 1) and associated piston actuator assembly 32 (FIG. 1), including the piston actuator springs 34 (FIG. 1). It will be appreciated that utilization of the clutch module 200 significantly reduces amount of space required within the housing 136 of the gearset system 110 over the gearset system 10 of FIG. 1, particularly in the axial direction.

Figure 3:
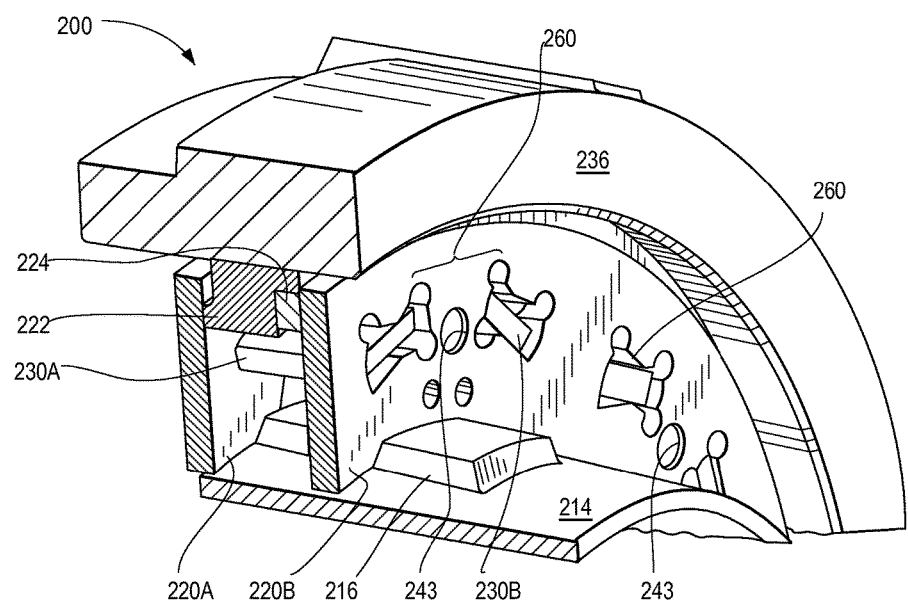
FIG. 3 is both a perspective and cross-sectional view of a portion of the schematically depicted clutch module of FIG. 2.

Referring now to FIG. 3, the multi-mode clutch module 200 incorporates an interior driven hub 214 which contains an array of circumferentially spaced cogs 216 adapted to secure an inner race 220 to the hub 214 for rotation therewith. As disclosed, the inner race 220 is comprised of first and second spaced plates 220A and 220B. An outer race 222, sandwiched between the pair of inner race plates 220A, 220B, is situated so as to allow for relative rotation between inner and outer races. As disclosed, a cam actuator ring 224 is interposed between one of the race plates and the outer race to control movements of pairs of opposed pawls 230. A first set of pawls 230A is trapped, and hence retained between the inner race plates, to allow limited angular movements of the pawls held within bowtie shaped apertures 260, while the second set of pawls 230B is similarly trapped and retained for their limited angular movements within a second like but oppositely oriented set of apertures 260.

The above-described physical elements of the multi-mode clutch module 200 are all contained within a housing 236. A plurality of spaced apertures 243 are adapted to accommodate rivets (not shown) for providing fixed and rigid securement of each of the two inner race plates 220A and 220B relative to the other.

In operation, the multi-mode clutch module 200 may be adapted to freewheel in both directions of rotation whenever the cam actuator ring 224 is circumferentially rotated to a first position; i.e. during active utilization of the forward gears. Conversely, during reverse engagement, the actuator 224 is circumferentially rotated to a second position in which both sets of pawls 230A, 230B, may be effective to lock the inner race with the outer race, again in both directions of rotation.

Referring now to FIG. 4, a schematic depiction of the planetary gearset housing 136 of FIG. 2 which utilizes single planetary gears 120 is provided to show how each of the planetary gears 120 makes rolling contact with both the sun gear 114, rotatable about the center axis a-a, and the ring gear 122. The planetary gears 120 are thus adapted to move along the dashed circle depicted as b-b. It will be appreciated that the centers 142 of the planetary gears 120 are actually hubs to which a planetary carrier structure is rigidly secured for rotation relative to the sun and ring gears 114, 122. A support element 144 of FIG. 4 symbolically represents that the ring gear 122 may be selectively fixed to the gearset housing 136.

The schematic depiction of the planetary gearset housing 136' of FIG. 5 reveals an alternate arrangement utilizing so-called double or compound planetary gears 120'A and 120'B. This option reverses the relative rotations of sun, planet, and ring gear elements, and offers additional flexibility with respect to range of available gear ratios since the greater number of elements may provide more speed options as a function of gear sizing, for example.

In a compound planetary gear arrangement, it will be seen that the respective compound planetary gears 120'A and 120'B actually make contact with each other in each instance, in addition to making contact with only one of either the ring gear 122' or the sun gear 114', as compared to the single planet arrangement described above.

Figure 7:
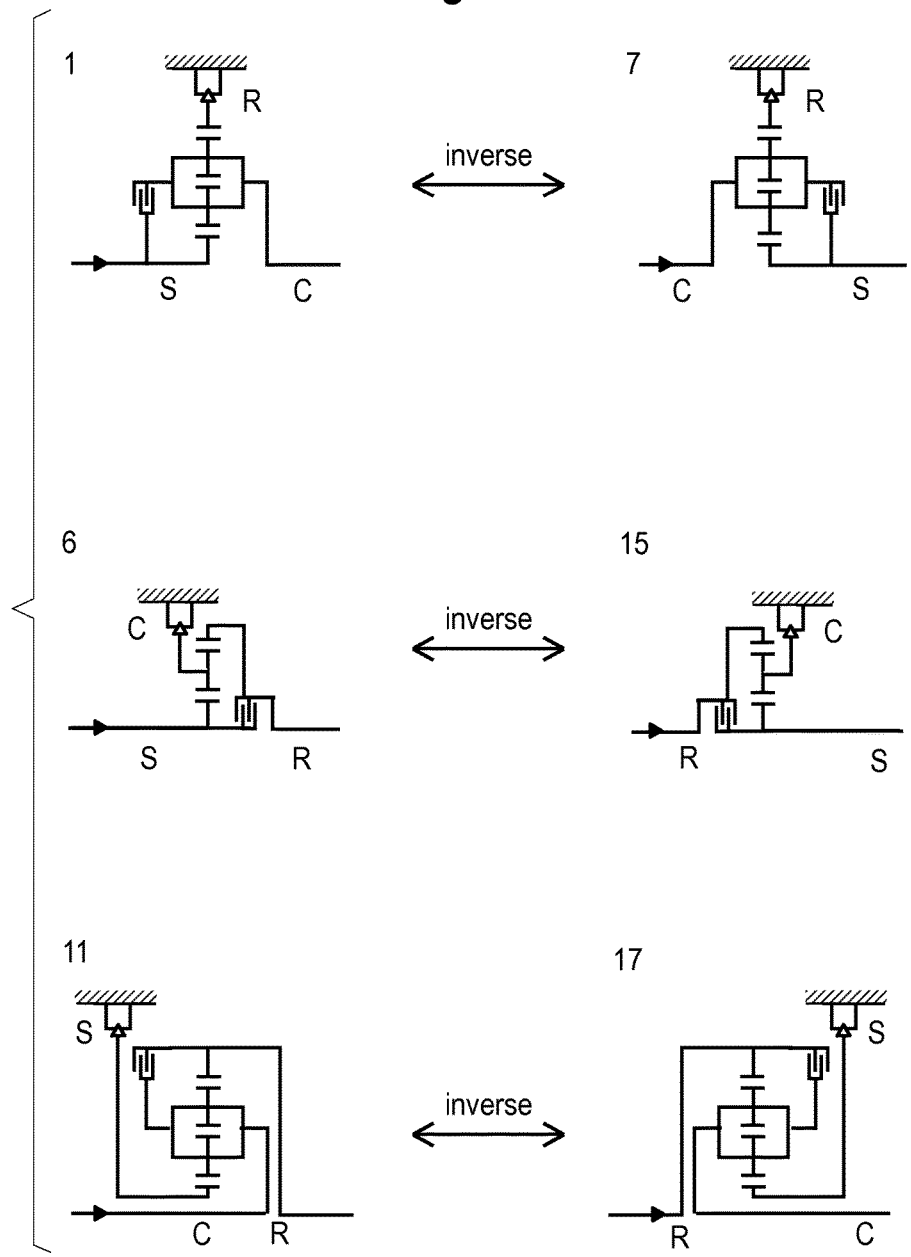
FIG. 7 schematically depicts a first set of advantageous configurations from the group of configurations listed in the chart of FIG. 6.

FIG. 6 provides a chart which offers a list of configurations under which the planetary gearset system 110 of the present disclosure may be utilized. Referring now also to FIG. 7, it will be noted that designated configurations of selections 1, 6, 7, 11, 15, and 17 (as listed in first column of the chart) are schematically depicted. It will be appreciated that the second and third columns of the chart in FIG. 6 respectively designate which planetary element is directly connected to the transmission input component 116 (FIG. 2) and which planetary element is directly connected to the output component 124 (FIG. 2). As noted earlier, the input and output components can be switched without impacting or in any way altering the principal concepts of this disclosure.

The fourth column of the chart depicts which element is grounded by way of the reverse multi-mode clutch 200 (FIG. 2), while the fifth column of the chart indicates which of the elements are coupled together by the forward (friction) clutch 126. Finally, the sixth column depicts whether the particular selection calls for a single or compound planetary gear arrangement in accordance with the schematic views of FIGS. 4 and 5, previously discussed.

With respect to the numbers provided in the chart, the numbers 1 through 18 of the first column depict a particular selection of planetary clutch configuration. The numbers 1, 2, and 3 in the second through fifth columns depict the specific planetary component designation; the number 1 designating the planetary sun gear (S), the number 2 designating the planetary carrier (C), and the number 3 designating the ring gear (R).

Thus, referring now to FIG. 7, and particularly to the schematic configuration designated as selection 1, it will be seen that the sun gear is the designated input, the carrier is the designated output, and the ring gear is grounded by way of the reverse clutch. The schematic configuration of selection 7 is indicated as being the inverse of the selection 1. As such, selection 7 provides that the carrier is the designated input, the sun gear is the designated output, and the ring gear is grounded by way of the reverse clutch.

Similarly, schematic configurations of paired or inverse selections 6 and 15 are provided immediately below the inverse selections 1 and 7, discussed above. Selection 6 provides that the sun gear is the input, the ring gear is the output, and that the carrier is grounded by way of the reverse clutch. Inversely, the selection 15 has the ring gear as the input, the sun gear as the output, and the carrier as the planetary component grounded by way of the reverse clutch.

Finally, schematic configurations of inverse selections 11 and 17 are presented as a side-by-side pair at the bottom of FIG. 7. Selection 11 provides that the carrier is the input, the ring gear is the output, and that the sun gear is grounded by way of the reverse clutch. On the other hand, selection 17 provides that the ring gear is the input, the carrier is the output, and that the sun gear is grounded by way of the reverse clutch.

Figure 8:
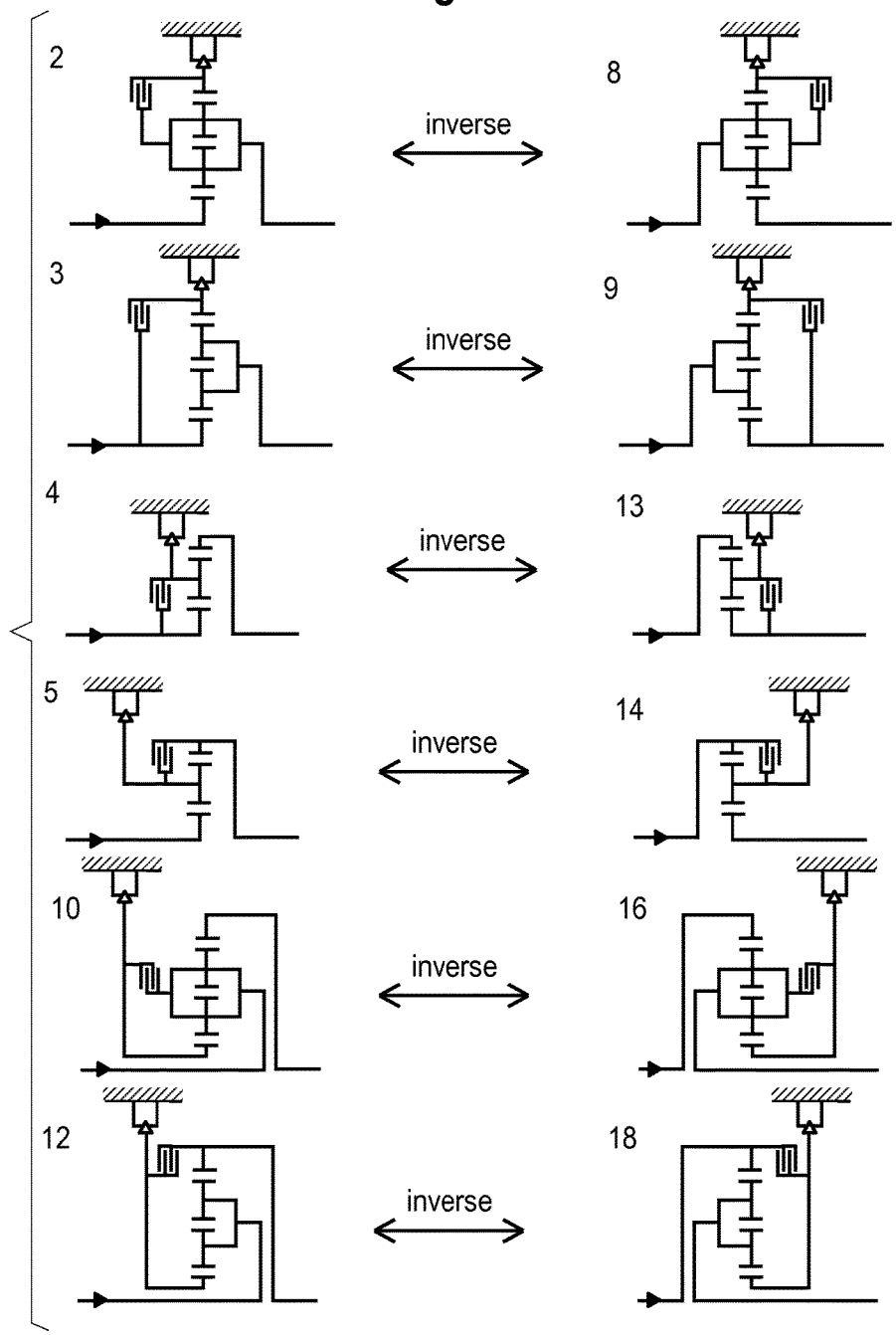
FIG. 8 schematically depicts all remaining configurations listed in the chart of FIG. 6.

For the purpose of completeness, all remaining selections listed in the chart of FIG. 6 are provided in FIG. 8 in similarly inversely paired formats, requiring no additional explanation.

Although the disclosure presented herein has been primarily focused on application in an automotive setting, and particularly to step-type automatic transmissions, the disclosure should be considered applicable to numerous other possibilities and configurations that include CVT transmissions as well as non-transmission uses.

For example, the planetary gearsets described herein may be useful in a variety of equipment uses, such as lawnmower, as well as various industrial and off-road applications such as power takeoffs, as well. Also, by way of example, the disclosed multi-mode clutch may also be used to replace both friction clutches of FIG. 1, such that dual multi-mode clutches would handle both forward and reverse control of a gearset system 110, i.e. without inclusion of any friction clutches.

By way of further example, a single multi-mode clutch could be incorporated as a forward clutch, not only a reverse clutch as the configurations referenced herein have offered. Further, such a multi-mode clutch may operate so as not to lock in both directions. For example, it could be modified to lock in a driving direction and to freewheel in the non-driving direction, even when used as a reverse control.

In addition, there are numerous other configurations that may be envisioned with respect to FIGS. 7 and 8. Thus, the chart of FIG. 6 could contain at least 54 combinations instead of only 18, for example if combinations of using the friction clutch for reverse instead of for only forward gears are included, along with combinations specific to use of dual multi-mode clutches, i.e. avoidance of any friction clutch.

Finally, the multi-mode clutch configuration should not be limited to that described in FIG. 3, as there are numerous multiple mode clutch configurations that may be suitable for use with a planetary gearset in accordance with this disclosure. As such, the multi-mode clutch configuration of FIG. 3 should be construed as just one potential configuration applicable to this disclosure.

Figure 9:
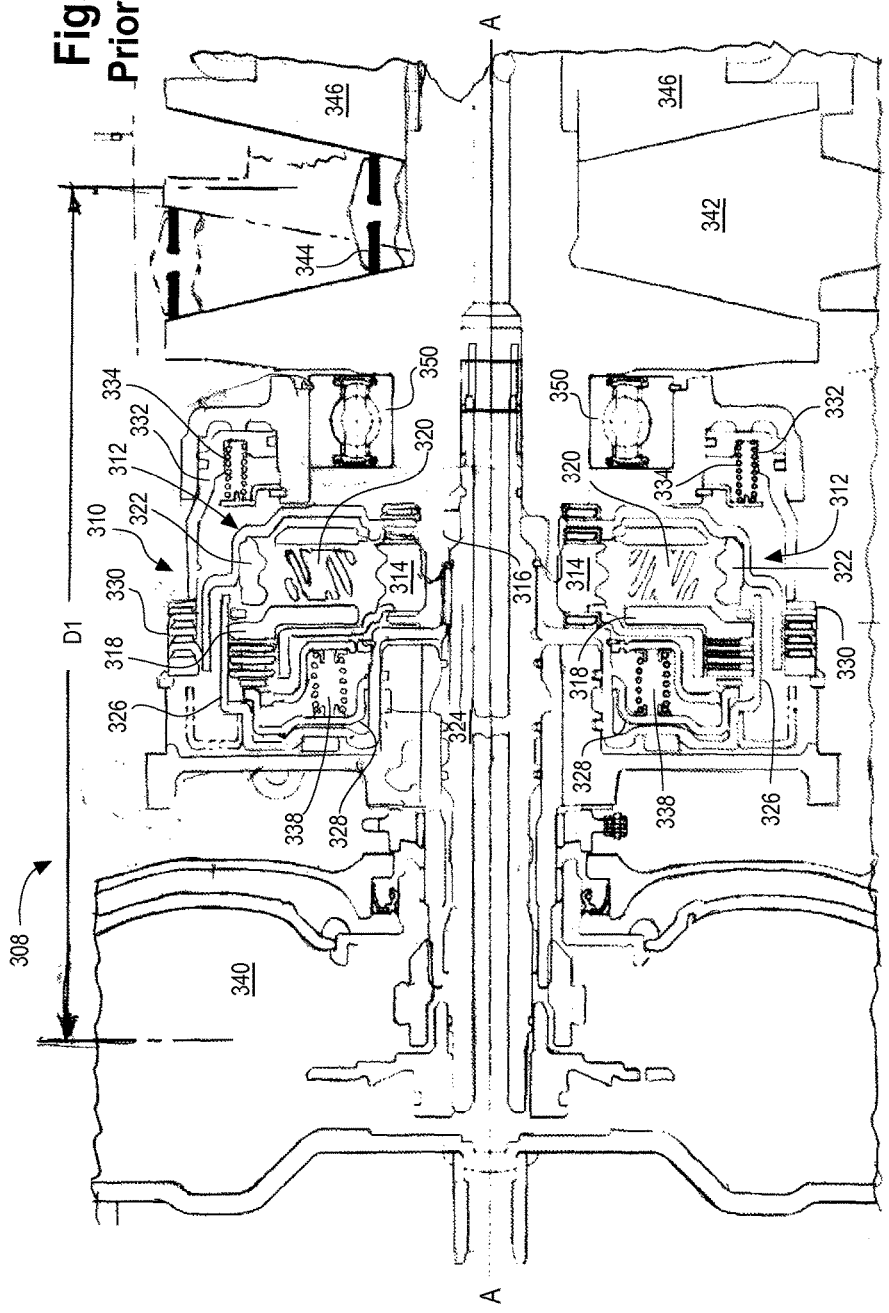
FIG. 9 is a cross-sectional view of another planetary gearset system having forward and reverse friction clutches constructed in accordance with the prior art.

For example, referring now to FIG. 9, a cross-sectional depiction of another prior art planetary gearset system 310 includes a planetary gearset 312. The gearset 312 includes a planetary carrier 318 splined to a transmission output component 324. Elements of the planetary gear set 312 and a transmission input component 316 revolve about an axis A-A, albeit at different speeds of rotation. A planetary gear carrier 318 rotatably supports planet or planetary gears 320. The carrier 318 is coupled to the transmission input component 316, which may or may not be rotatable within a transmission output component 324. The latter may be hollow and contain internal bearings (not shown) to pilot or to otherwise accommodate the input component 316. The planetary gears 320 rotate directly on and about the sun gear 314; the sun gear 314 and planetary gears 320 all rotate about the axis A-A within a ring gear 322 as shown, and as may be appreciated by those skilled in this art.

A first friction clutch operates as a forward clutch 326, and is adapted to be engaged during operation of all forward operating gears of the planetary gearset. The forward clutch 326, configured to interact with the planetary gear carrier 318, is actuated by a piston actuator assembly 328. A second friction clutch operates as a reverse clutch 330, and is adapted to be engaged only during reverse operation of the planetary gearset 312. The reverse clutch 330 is actuated by a piston actuator assembly 332.

Continuing reference to FIG. 9, the planetary gearset system 310 may be configured for being positioned between a torque converter 340 and a continuously variable transmission (CVT) 342, the latter including a system of belts 344 and pulleys 346, as shown, for providing an infinitely variable range of transmission gear ratios between its lowest and highest ratio limits, as will be appreciated by those skilled in the art. The system of belts 344 and pulleys 346 of the CVT 342 are supported on bearings 350, as shown.

Bulkiness is an unfortunate attribute of a friction-style clutch, as the described forward and reverse friction clutches 326 and 330 may exemplify. For example, the piston actuators 332 and 328 have respective springs 334 and 338 which utilize relatively significant amounts of physical space within the physical housing space 308 of the planetary gearset system 310, particularly with respect to axial spacing between the above-described components 340 and 342, a measurable length referenced as D1 in FIG. 9.

Moreover, the friction discs and separator plates utilized within respective traditional forward and reverse friction clutches 326, 330, may tend to promote considerable parasitic drag.

Figure 10:
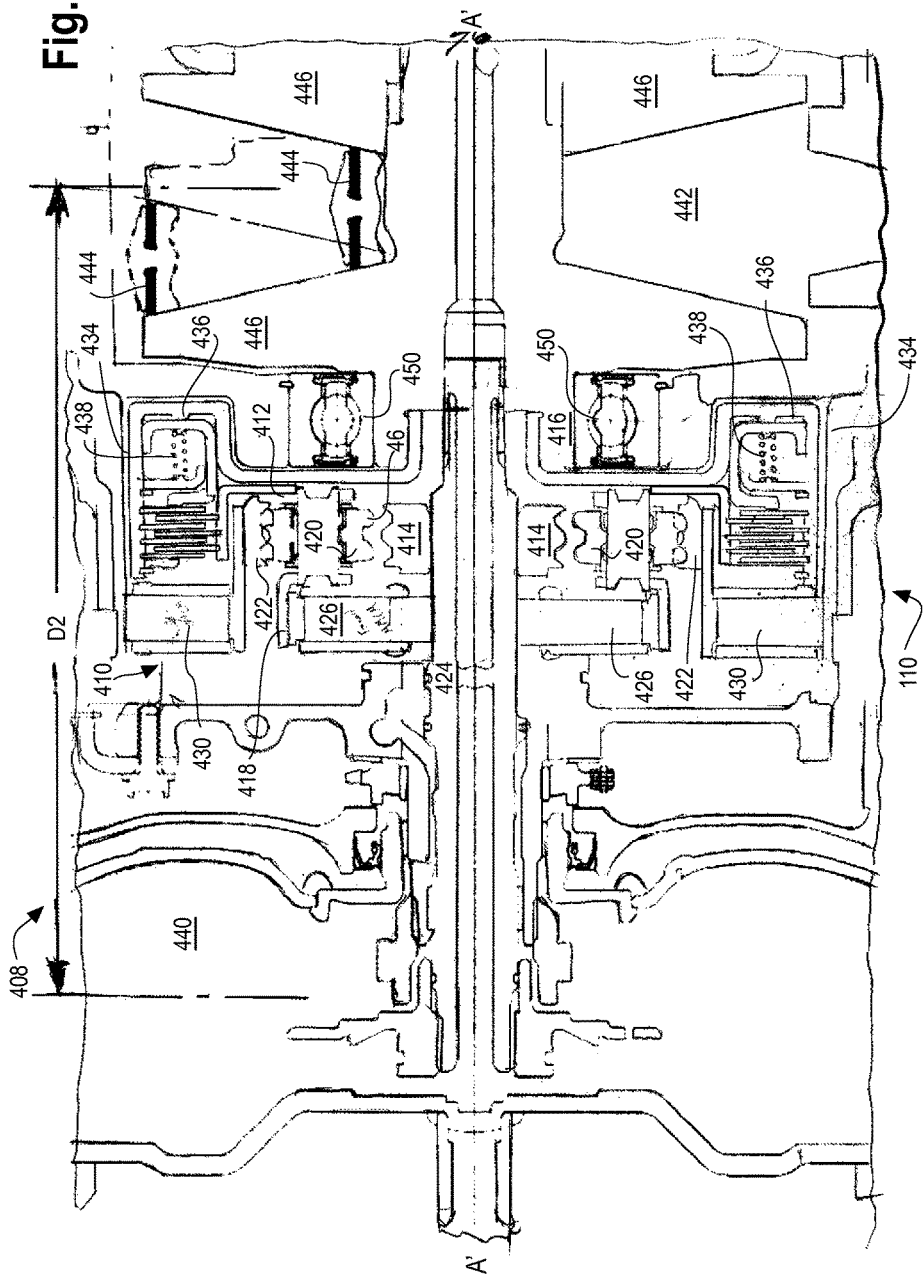
FIG. 10 is a cross-sectional view of another embodiment of a planetary gearset system constructed in accordance with the present disclosure, also including forward and reverse clutches, but with each of the forward and reverse friction clutches of FIG. 9 having been replaced by a multi-mode clutch module.

Referring now to FIG. 10, a nested forward/reverse multimode modular clutch approach is utilized in a planetary gearset system 410 is provided for a planetary gearset 412 in lieu of the forward/reverse planetary gearset system 310 for the planetary gearset 312 (of FIG. 9). The planetary gearset system 410 provides a) physical reduction in a measurable axial length of a corresponding transmission housing space 408, shown as D2 (cf. D1 of FIG. 9), and b) greater operational efficiencies, as noted above. As such, in FIG. 10, the axial length D2 associated with the planetary gearset system 410 is shorter than the corresponding length D1 of FIG. 9, when configured in accordance with the present disclosure.

The planetary gearset system 410 is similarly adapted to control the forward and reverse functions of a planetary gearset 412. Continuing reference to FIG. 10, the planetary gearset 412 correspondingly contains a sun gear 414 splined to an input component 416, and a planetary carrier 418, planetary gears 420, and a ring gear 422, all similar to elements described with respect to the planetary gearset system 310 of FIG. 9.

The planetary gearset 412 includes transmission output component 424, and both the gearset 412 and output component 424 are configured for rotation about a common axis A'-A', as shown. However, instead of utilizing the forward and reverse friction clutches 326, 330, of FIG. 9, the planetary gearset system 410 incorporates a pair of multimode clutch modules, a forward multi-mode clutch module 426 which is radially nested within a reverse multi-mode clutch module 430, as depicted in FIG. 10. Those skilled in the art will appreciate that the symmetrical nesting of the two clutch modules 426 and 430 will promote minimal use of axial space within the housing space 408. As such, the axial dimension D2 may be measurably reduced by the use of the disclosed arrangement of FIG. 10.

A friction clutch 434 may also be utilized in the described arrangement, but not as a forward or reverse clutch. Instead the friction clutch 434 may be configured to operate in series with the forward and reverse modular clutches 426, 430 to enhance operating utility of the planetary gearset system 410. The modular clutch of the type described herein is a radially acting dog clutch. The latter has several limitations that the traditional friction clutch does not have. For one, it cannot normally disengage under heavy torque loads. Secondly, at higher speeds any engagements tend to be associated with an audible "clunk" sound. Both aspects are overcome via incorporation of the described friction clutch 434, which includes a clutch actuator 436, and springs 438 (FIG. 10), packaged in the housing space 408 radially outwardly of the planetary gearset 412 as shown, to minimize axial space requirements. As configured in the planetary gearset system 410, the friction clutch 434 may be selectively operated so as to permit engagements and disengagements of the respective multi-mode clutches 426, 430 without the noted drawbacks.

Finally, in FIG. 10, the nested multi-mode planetary gearset system 410 is shown positioned between a torque converter 440 and a continuously variable transmission (CVT) 442, the latter containing belts and pulleys 444, 446, and supported by bearings 450.

Referring now to FIGS. 11-14, the forward and reverse modular clutches 426 and 430 may now be described in detail.

Figure 11:
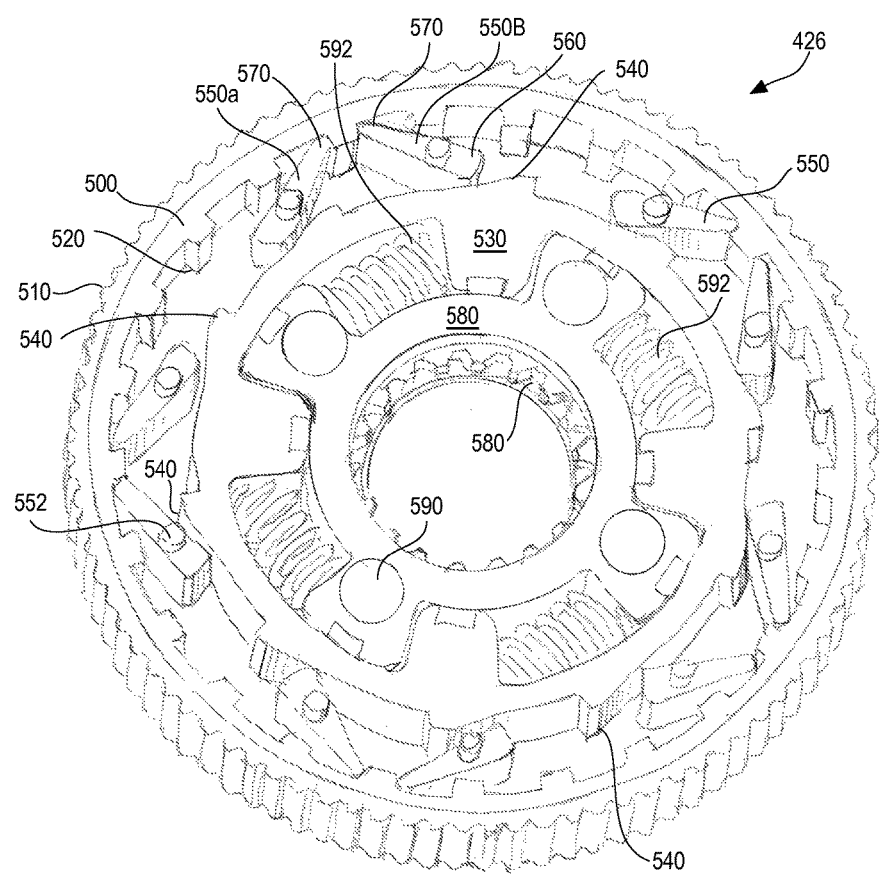
FIG. 11 is a perspective side view of the forward multi-mode clutch module of FIG. 10, with inner race plates removed for clarity.
Figure 13:
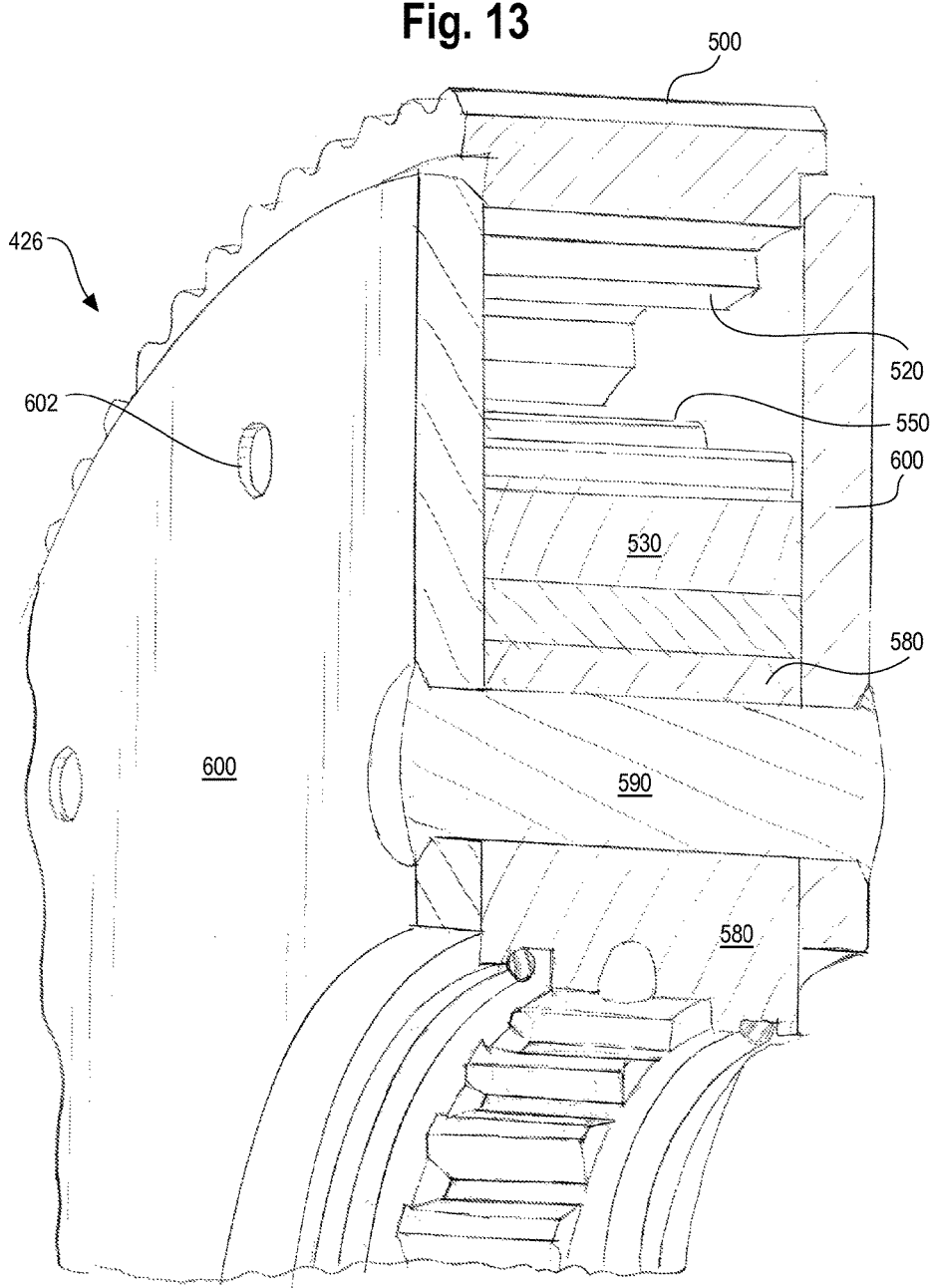
FIG. 13 is a perspective and cross-sectional radial view of the forward multi-mode clutch module shown in FIG. 11.

In FIG. 11, the modular clutch 426 is depicted herein as one type of a radially acting dog clutch in the disclosed embodiment, although other multi-mode clutch modules may fall within the scope of this disclosure. The modular clutch 426 has two modes, a first mode permitting freewheeling in both directions, while a second mode is an "engaged" or otherwise locked mode for transmittal of torque in both directions. Referring now also to FIG. 13, the modular clutch 426 includes an annular outer race 500 containing a plurality of axially oriented splines that define its outer circumference. The outer race 500 contains a plurality of radially extending notches 520 that define its radially inner circumference. The modular clutch 426 further includes five opposed sets of pawls 550 (550A and 550B, corresponding to earlier described pawls) that interact with a cam actuator ring 530 adapted to "clock", i.e. move rotatably between two angular limits or "hard stops".

Any convenient number of sets of pawls 550 may be employed, although only five sets are utilized in the disclosed embodiment. Each distinct set of opposed pawls 550A and 550B are adapted to transmit torque in either a driving rotational direction, or oppositely in a non-driving rotational direction. The cam actuator ring 530 includes a set of cam ramps 540 configured to move the heels 560 of the pawls 550 selectively into and out of engagement with the notches 520. Pawl springs (not shown) are configured to bias the pawl toes 570 radially outwardly for engagement with the notches 520.

An actuator hub assembly 580 is adapted to hydraulically shift the cam actuator ring 530 between its two angular limits to move the pawls 550 into and out of engagement with the notches 520, as described. For this function, the so-called rotary actuator hub 580 is secured by rivets 590 to a pair of inner race plates 600 (FIG. 13). In the disclosed embodiment, only four rivets 590 are used (FIG. 11), although that number is not fixed, and would normally be a function of various design considerations, including expected torque loads.

Although not fixed to the inner race plates 600 as is the actuator hub assembly 580, the pawls 550 are movably retained between the inner race plates 600 for limited rotation via support bosses 552 (FIG. 11), which extend axially from each side of each pawl 550 for retention within inner race apertures 602 (FIG. 13). As will be appreciated by those skilled in the art, the pawls 550 are effective to transmit torque between the inner race plates 600 and the outer race 500.

As noted earlier, the actuator hub assembly 580, via the cam actuator ring 530, is configured to switch the forward clutch 426 between the two referenced modes; i.e. freewheeling in both rotational directions or locked in both rotational directions. Referring now specifically to FIGS. 10 and 11, the actuator hub assembly 580 (FIG. 11) is adapted to be splined to the input component 416 (FIG. 10), while the outer race 500 (FIG. 11) is adapted to be splined to the earlier described planetary carrier 418 (FIG. 10). The actuator hub assembly 580 is hydraulically actuated in the disclosed embodiment, and is a single-acting hydraulic actuator, as it operates to compress the springs 592 to "clock" the cam actuator ring 530 between the described selective clutch modes.

In the configuration shown, the actuator hub assembly 580 is physically actuated via hydraulic fluid (not shown), which causes the cam actuator ring 530 to rotate counterclockwise so as to move the cam ramps against the pawl heels 560, deflecting the pawl toes 570 inwardly to disengage the latter from the notches 520 of the outer race 500. As such, the forward clutch 426 may be selectively operated in the freewheeling mode in both driving and non-driving rotational directions. Conversely, upon release of hydraulic pressure, the springs 592 will be effective to return the cam actuator ring 530 to its normally spring-loaded position, wherein the pawls will be in a locked mode position, again in both rotational directions.

In the disclosed embodiment, the actuator hub assembly 580 is a single-acting rotary hydraulic actuator with a spring return. Alternatively, the actuator may be a double-acting, or fully hydraulic, actuator within the scope of this disclosure. Moreover, the actuator can be designed to operate via other power sources, including pneumatically or electro-mechanically, in addition to the disclosed hydraulic example provided herein.

Figure 12:
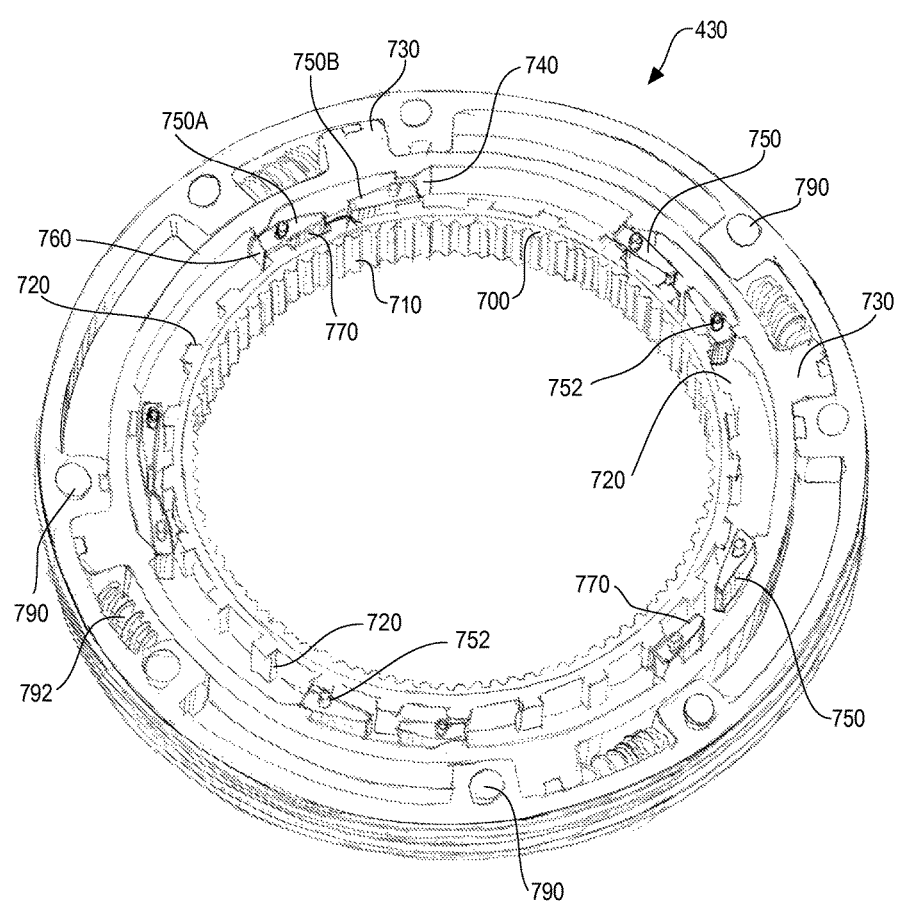
FIG. 12 is a perspective side view of the reverse multi-mode clutch module of FIG. 10, with outer race plates removed for clarity.
Figure 14:
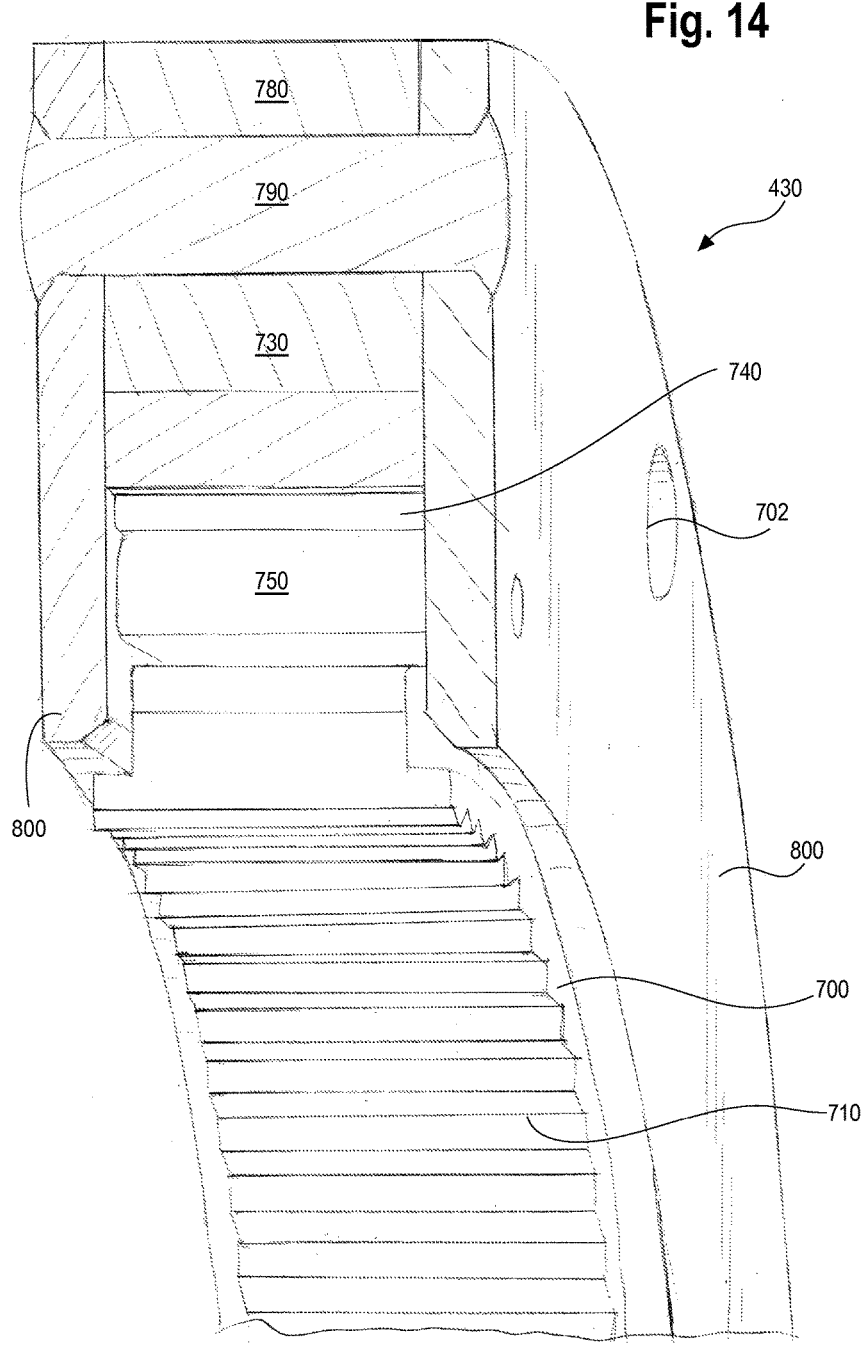
FIG. 14 is a perspective and cross-sectional radial view of the reverse multi-mode clutch module shown in FIG. 12.

As previously noted, the described forward clutch 426 is radially nested within the reverse clutch 430. This arrangement is effective to significantly reduce the axial housing dimension D2 as earlier described. Referring now to FIGS. 12 and 14, the reverse clutch 430 is a modified dog clutch configuration that operates similarly to the forward clutch 426 in that it locks in both rotational directions in a first mode, while freewheeling in both rotational directions in the second mode.

However, it will be appreciated by those skilled in the art that several aspects of the reverse clutch 430 and the forward clutch 426 are inverted in their respective or relative positions and/or otherwise have opposite characteristics. For example, an inner race 700 of the reverse clutch 430 contains axially oriented splines 710 that are configured to engage mating exterior splines (not shown) of the ring gear 422 in the planetary gear set 412 (FIG. 10). The inner race 700 also contains radially outer (rather than inner) notches 720 adapted to interact with a cam actuator ring 730 via pawls 750. The cam actuator ring 730 is adapted to rotatably move between two angular limits, analogously to the inversely operating cam actuator ring 530 of the forward clutch 426. The cam actuator ring 730 of the reverse clutch 430 also contains cam ramps 740 (FIG. 12) designed to engage the heel ends 760 of the pawls 750 to control engagements of the toe ends 770 of the pawls with the radially outer notches 720.

Referring now specifically to FIG. 14, a plurality of rivets 790 are adapted to secure a pair of outer (rather than inner) race plates 800 together, so as to sandwich the described actuator and pawl components. In the disclosed embodiment, a total of eight rivets 790 are employed to secure the outer race plates 800 together, although the specific number of rivets may be determined by design considerations, including anticipated torque loads. Moreover, the outer race plates of the reverse clutch 430 do not rotate, but are relatively fixed within the housing space 408 (FIG. 10).

Analogously to the forward clutch 426, the reverse clutch 430 includes an outer ring configured actuator assembly 780 which functions as a single-acting hydraulic actuator, similarly to the actuator hub assembly 580 (FIGS. 11, 13). However, in the reverse clutch 430 (FIGS. 12, 14), the pawl springs (omitted for clarity) are configured to bias the pawl toes 770 radially inwardly to engage the radially outer notches 720. With respect to the notches 720 and the cam actuator ring 730, the sets of opposed pawls 750A, 750B are adapted to react correspondingly similar to the pawls 550A, 550B (FIGS. 11, 13). Moreover, the pawls 750 also correspondingly include axial support bosses 752 for supporting rotation of the pawls 750 within apertures 702 (FIG. 14) of the outer race plates 800.

The actuator assembly 780, secured to the outer race plates 800, is adapted to internally receive hydraulic fluid so as to cause the cam actuator ring 730 to rotate counterclockwise (in the view shown) against the resistance of the actuator springs 792. The cam ramps 740 will move to permit the pawl heels 760 to move radially outwardly which will, in turn, cause the toes 770 of the pawls 750 to deflect radially inwardly under the force of pawl-biasing springs (not shown). The toes 770 will engage the radially outer notches 720 to effectively lock the reverse clutch 430 in a first mode in both rotational directions. Conversely, upon release of hydraulic pressure, the actuator springs 792 will be effective to "clock" back the cam actuator ring 730, causing the toes 770 to disengage from the radially outer notches 720 to define a second mode. The result will be that the reverse clutch 430 is then configured to freewheel in both rotational directions.

Referring now back to FIG. 10, the operation of the forward and reverse clutches 426 and 430 in the disclosed planetary gearset system 410 is configured to provide that one module, for example the forward clutch module 426, is selectively locked in both rotational directions whenever the other (e.g. the reverse clutch module 430) has been switched to its freewheel mode, so as to freewheel in both rotational directions. Conversely, when the reverse module 430 becomes locked in both rotational directions, the forward clutch module 426 may be adapted to freewheel in both directions.

Although the disclosure presented herein has been primarily focused on application in an automotive setting, and particularly to CVT-type automatic transmissions, the disclosure should be considered applicable to numerous other possibilities and configurations that include non-transmission uses.

For example, the planetary gearsets described herein may be useful in a variety of equipment uses, such as lawnmower, as well as various industrial and off-road applications such as power takeoffs, as well.

Finally, the multi-mode clutch configuration should not be limited to that described, as there are numerous multiple mode clutch configurations that may be suitable for use with a planetary gearset in accordance with this disclosure. As such, the particular multi-mode clutch configuration described should be construed as just one potential configuration applicable to this disclosure.

INDUSTRIAL APPLICABILITY

The planetary gearset system including the multi-mode clutch module of this disclosure may be employed in a variety of applications, including but not limited to, automobiles, trucks, off-road vehicles, and other machines that may benefit from selectable forward/reverse directional control.

The disclosed structures may offer unique approaches to enhancing efficiencies unavailable when using two friction clutches; i.e., one for each of forward and reverse gearset control. Moreover, the replacement of one or more friction clutches with a multi-mode clutch may provide for a relatively simple and reliable reduction of parasitic drag, as well as allow for size reductions in an overall gearset package.

What is claimed is:

1. A planetary gearset system comprising at least a pair of clutches adapted to facilitate forward and reverse directional control, at least one of the clutches being a multi-mode clutch module, wherein the clutch module is defined by a plurality of races having elements interposed between the races, the elements adapted to selectively lock the races together; wherein the planetary gearset system is configured for to transfer torque to a continuously variable transmission; wherein the planetary gearset system includes a planetary gearset having operable elements including a sun gear, planetary gears, a planetary carrier supporting the planetary gears for rotation about the sun gear, and a ring gear within which the sun, planetary gears, and carrier are supported, each operable element adapted to rotate at a different rotational speed; and wherein the at least one multi-mode clutch module is configured to selectively provide either forward or reverse directional control of the continuously variable transmission.

2. The planetary gearset system of claim 1, wherein one of the clutches is a multi-mode clutch, and wherein another of the pair of clutches is a friction clutch.

3. The planetary gearset system of claim 1, wherein the pair of clutches comprise clutch modules that are radially nested with respect to each other, such that one module defines a radially outer clutch module, and the other defines a radially inner clutch module.

4. Clutch modules for a planetary gearset, at least one of the modules being a multi-mode clutch module, the gearset including a sun gear, planetary gears, a planet carrier adapted to support the planetary gears for rotation about the sun gear, and a ring gear within which the sun, the planetary gears, and the carrier are each adapted to rotate at different rotational speeds; the clutch modules comprising:
a first clutch module configured to control forward directional control of the planetary gearset, and a second clutch module configured to control reverse directional control of the planetary gearset;
the multi-mode clutch module being defined by a plurality of races having elements interposed between the races, the elements adapted to selectively lock the races together.

5. The clutch modules of claim 4, wherein one of the first or second clutch modules is a radially inner clutch module and the other is a radially outer clutch module.

6. The clutch modules of claim 5, wherein the radially inner clutch module is a forward clutch module, and wherein the radially outer clutch module is a reverse clutch module.

7. The clutch modules of claim 4, wherein each of the clutch modules is operably engaged with at least one of the planetary gearset elements.

8. The clutch modules of claim 6, wherein the reverse clutch module engages the ring gear of the planetary gearset.

9. The clutch modules of claim 6, wherein the forward clutch module engages the carrier of the planetary gearset.

10. The clutch modules of claim 6, wherein the reverse clutch module engages the carrier of the planetary gearset.

11. The clutch modules of claim 6, wherein the forward clutch module engages the ring gear of the planetary gearset.

12. A planetary gearset system, comprising:
a planetary gearset having operable elements including a sun gear, planetary gears, a planetary carrier supporting the planetary gears for rotation about the sun gear, and a ring gear within which the sun, planetary gears, and carrier are supported, each operable element adapted to rotate at a different rotational speed;
a pair of clutches configured to control forward and reverse directional rotation of the planetary gearset,
the pair of clutches each defined by a multi-mode clutch module, one of the modules being adapted to control forward directional control of the planetary gearset, the other of the modules being adapted to control reverse directional control.

13. The planetary gearset system of claim 12, wherein each of the clutch modules is engaged with at least one of the operable elements of the planetary gearset.

14. The planetary gearset system of claim 12, wherein one of the pair of clutch modules is a radially inner clutch module and the other is a radially outer clutch module.

15. The planetary gearset system of claim 14, wherein the radially inner clutch module is a forward clutch module, and the radially outer clutch module is a reverse clutch module.

16. The planetary gearset system of claim 15, wherein the reverse clutch module engages the ring gear of the planetary gearset.

17. The planetary gearset system of claim 15, wherein the forward clutch module engages the carrier of the planetary gearset.

18. The planetary gearset system of claim 15, wherein the reverse clutch module engages the carrier of the planetary gearset.

19. The planetary gearset system of claim 15, wherein the forward clutch module engages the ring gear of the planetary gearset.

20. The planetary gearset system of claim 15, wherein the radially inner clutch module is radially nested within the radially outer clutch module.

* * * * *